(12) United States Patent
Mochizuki

(10) Patent No.: US 7,028,637 B2
(45) Date of Patent: Apr. 18, 2006

(54) DISCHARGED WASTE PROCESSING MATERIAL FOR PET ANIMALS

(76) Inventor: Shotaro Mochizuki, 3-6-16, Ando, Shizuoka-shi, Shizuoka-ken (JP)

( * ) Notice: Subject to any disclaimer, the term of this patent is extended or adjusted under 35 U.S.C. 154(b) by 0 days.

(21) Appl. No.: 10/880,575

(22) Filed: Jul. 1, 2004

(65) Prior Publication Data

US 2005/0000463 A1    Jan. 6, 2005

(30) Foreign Application Priority Data

Jul. 3, 2003    (JP) .............................. 2003-270745

(51) Int. Cl.
*A01K 29/00*    (2006.01)
(52) U.S. Cl. ...................................... 119/172
(58) Field of Classification Search ............ 119/171, 119/172, 28.5, 165, 166, 167, 169, 170, 442, 119/447, 458, 479, 161; 424/76.6, 76.5; 502/400, 401

See application file for complete search history.

(56) References Cited

U.S. PATENT DOCUMENTS 5,823,139 A  * 10/1998 Ito .............................. 119/171
6,148,768 A  * 11/2000 Ochi et al. ................... 119/172

FOREIGN PATENT DOCUMENTS

| JP | 2895963 | 5/1999 |
|---|---|---|
| JP | 2971949 | 11/1999 |
| JP | 2002218855 | * 8/2002 |

* cited by examiner

*Primary Examiner*—T. Nguyen
(74) *Attorney, Agent, or Firm*—Wenderoth, Lind & Ponack, L.L.P.

(57) ABSTRACT

A discharged-waste processing material for pet animals is formed from a waste material of double sided water resistant paper as a raw material. A chief material of the discharged-waste processing material is crushed paper pieces obtained by finely crushing the double sided water resistant paper having laminate layers on both sides. A granular body is formed of an aggregate of the crushed paper pieces and has voids formed between the laminate layers of adjacent crushed paper pieces for guiding discharged urine into a core part of the granular body. The granular body has a water retaining structure in which the discharged urine is absorbed into a paper layer between the laminate layers through a sheared surface of each crushed paper piece, and the absorbed urine is cut off by the laminate layers so that the urine is retained in the paper layers.

8 Claims, 3 Drawing Sheets

DISCHARGED WASTE PROCESSING MATERIAL FOR PET ANIMALS

TECHNICAL FIELD

This invention relates to a discharged-waste processing material for pet animals, in which a waste material of a double sided water resistant paper having a laminate layer on both surfaces is used as a raw material.

BACKGROUND ART

Patent Documents 1 and 2 provide a discharged-waste processing material for animals in which plastic material powder obtained from waste materials of paper diapers, sanitary napkins, incontinence pads and mother's milk pads, or scraps of those products, particularly, plastic material powders obtained from polyethylene film, polypropylene nonwoven fabrics, etc. which are used in those paper diapers, etc. are used as a chief material and granulated.

[Patent Document 1]
Official Gazette of Japanese Patent No. 2,895,963

[Patent Document 2]
Official Gazette of Japanese Patent No. 2,971,949

DISCLOSURE OF THE INVENTION

Problem to be Solved by the Invention

Although the above-mentioned discharged-waste processing material for animals is useful for enabling re-use of industrial wastes such as paper diapers, the individual particles of plastic or the individual crushed pieces of plastic constituting plastic powder material as a chief material of the processing material have a poor discharged-urine absorbing property and a poor discharged-urine retaining property. The urine discharged onto a granular material composed of such plastic material powder is rapidly passed among the particles of such plastic material powder and the discharged urine spreads widely. Thus, it is difficult to say that the plastic material powder is a suitable material as a discharged-waste processing material for animals.

Moreover, those discharged-waste processing materials for animals, when once used, are flushed in a flush toilet or recovered as rubbish. However, plastic material powder is not easily decomposed by bacteria treatment at the site of a sewage treatment plant. In addition, hazardous gas or the like is generated during a burning treatment.

Means for Solving the Problem

A discharged-waste processing material for pet animals according to the present invention is formed from a waste material of double sided water resistant paper used as a raw material, the double sided water resistant paper, as represented by a milk carton and the like, having a laminate layer of a water resistant film formed on opposing surfaces thereof. Crushed paper pieces are as a chief material, the crushed paper piece being obtained by crushing the double sided water resistant paper into the size of about 5 to 10 mm and having laminate layers formed on opposing surfaces thereof. A granular body is formed of an aggregate of the crushed paper pieces.

The granular body has voids formed between the laminate layers of adjacent crushed paper pieces, the voids guiding discharged urine into a core part of the granular body. The granular body has a water retaining structure in which the discharged urine is absorbed into the paper layers between the double sided laminate layers through sheared surfaces of the crushed paper pieces, and the absorbed urine is retained in the paper layers by the double sided laminate layers.

The double sided water resistant paper structure such as the above-mentioned milk carton, etc. and the crushed paper piece structure obtained by crushing the double sided water resistant paper and having a water resistant film laminate layer formed on each of the two surfaces renders a high suitability to the discharged waste processing material for pet animals and enhances the function as a processing material.

That is, the urine discharged onto the granular body is guided to the core part of the granular body through the voids formed between the laminate layers of the adjacent crushed paper pieces and in this process, the discharged urine is absorbed in the paper layers between the laminate layers formed on the opposing surfaces through the sheared surface of each crushed paper piece, and the absorbed urine is retained in the paper layers by the laminate layers formed on the opposing surfaces.

A large number of such granular bodies are laid in a tray or the like which forms a commode, so as to be subjected to urine discharge by pet animals. The granular body exhibits such a function that the discharged urine is guided to the core part of each granular body and retained therein. Thus, the granular body can effectively solve such problems that the discharged urine wets only the surface layer of the granular body and flows out to the adjacent granular bodies, or the discharged urine is rapidly passed through the granular body to eventually wet the granular bodies laid over the wide area on the tray.

Moreover, since the granular body is chiefly composed of paper, it is effective in environmental preservation and it can also be decomposed by bacteria.

The granular body preferably contains at least one of water absorbent polymer powder, vegetable powder, and vegetable fiber. Owing to this feature, the water absorbent polymer powder and the like is distributed in the void formed between the laminate layers of the adjacent crushed paper pieces, so that the powder of the water absorbent polymer, etc. co-acts with the crushed paper pieces to enhance the effect of capturing the discharged urine in the granular body.

The granular body may contain at least one of water absorbent polymer powder, vegetable powder, and vegetable fiber, and mineral powder such as calcium carbonate and clay.

The mineral powder is distributed in the voids formed between the laminate layers of the adjacent crushed paper pieces together with the powder of absorbent polymer, to thereby add weight to the granular body, so that the granular bodies are not scattered by pet animals such as cats and so that the granular bodies are prevented from adhering to the body hair of such pet animals.

The granular body is provided at a surface thereof with a cover layer having a water absorbing property, the cover layer exhibiting a viscous property when water is absorbed therein. This cover layer contains a water sensitive viscous material which exhibits a viscous property when it absorbs water.

The cover layer exhibits a viscous property while absorbing the discharged urine and allows the urine to permeate therethrough. This viscous property causes the adjacent granular bodies to join together to form an aggregate, and the aggregate thus formed is discarded, so that new granular bodies can be supplemented.

BRIEF DESCRIPTION OF THE DRAWINGS

FIG. 1B is a sectional view of a piece of double sided water resistant paper obtained by laminating a water resistant film on each surface which forms the beverage pack or a poster or the like.

DETAILED DESCRIPTION OF THE INVENTION

A preferred embodiment of the present invention will be described hereinafter with reference to FIGS. 1 through 6.

Figure 1A:
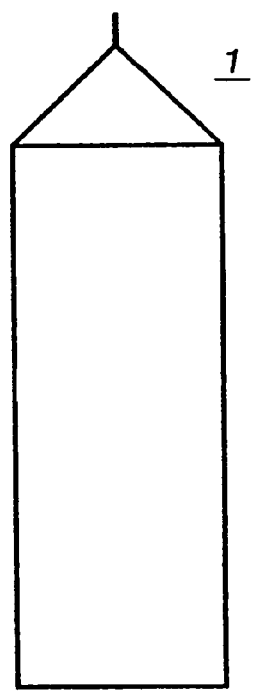
FIG. 1A is a side view of a beverage pack as represented by a milk carton.

A chief waste material used as a discharged-waste processing material for pet animals according to the present invention includes paper beverage packs 1 such as paper milk cartons, juice packs, wine packs and the like as shown in FIG. 1A. It may also include printed paper such as front covers of magazine, catalogues, posters and the like.

Especially, the beverage pack 1 and the printed paper obtained by laminating a plastic film, an aluminum sheet or the like on both surfaces of a paperboard 3 are used as raw material.

Figure 1B:
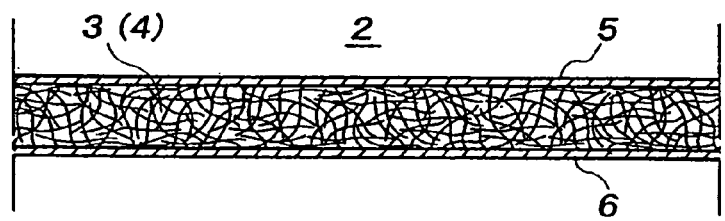

For example, the beverage pack 1 is composed of a paperboard 3 which is comparatively thick. It has a laminate structure in which an inner and an outer surface of the beverage pack 1, i.e., both surfaces of the paperboard 3 are laminated with a water resistant film composed of a plastic film, or it has another laminate structure in which an outer surface of the paperboard 3 is laminated with the plastic film and an inner surface thereof is laminated with aluminum. As shown in FIG. 1B, water resistant laminate layers 5, 6 are formed respectively on both surfaces of the paper layer 4 composed of entangled pulp fibers forming the paperboard 3.

Likewise, in the printed paper such as the catalogue and the poster, especially, in the printed paper obtained by laminating both surfaces with a plastic film, the water resistant laminate layers 5, 6 are formed respectively on both surfaces of the paper layer 4 composed of the entangled pulp fibers forming the paperboard 3.

Figure 2A:
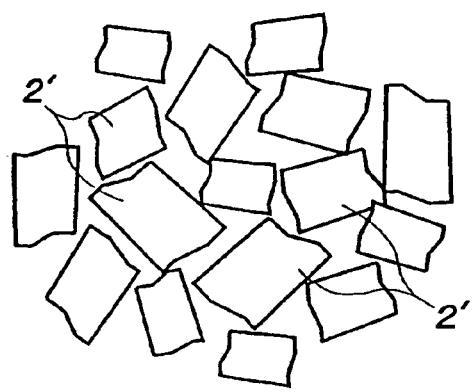
FIG. 2A is a plan view of crushed paper pieces obtained by crushing the double sided water resistant paper.
Figure 2B:
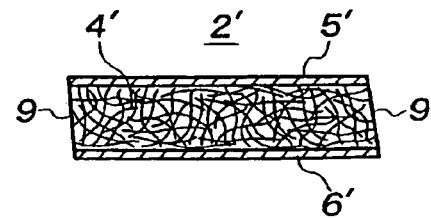
FIG. 2B is a sectional view of one of the above crushed paper pieces.

A waste material of the double sided water resistant paper 2 having the water resistant laminate layers 5, 6 formed respectively on both surfaces is used as a raw material, the double sided water resistant paper 2 is finely crushed into pieces having a size of about 1 mm to 10 mm, and as shown in FIGS. 2A and 2B, the crushed paper pieces (double sided water resistant paper pieces) 2' having the laminate layers 5', 6' formed respectively on both surfaces of the paper layer 4' composed of the entangled pulp fibers.

Figure 3A:
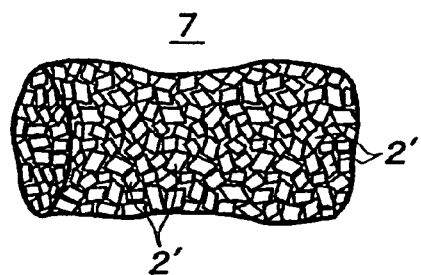
FIG. 3A is a perspective view of a granular body chiefly composed of an aggregate of the crushed paper pieces.
Figure 3B:
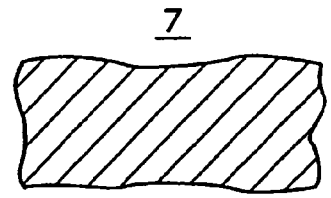
FIG. 3B is a sectional view of FIG. 3A.

The crushed paper pieces 2' are used as a main material. After applying a small amount of water, the crushed paper pieces 2' are granulated by a granulating machine and then dried to form a granular body 7 composed of an aggregate of the crushed paper pieces 2' and having the size of about 2 mm to 10 mm, as shown in FIGS. 3A and 3B.

The granular body 7 may contain various kinds of water absorbent materials as later described. In this case, the amount of the crushed paper pieces 2' is selected to be in the range of 30% to 90% (% by weight), the amount of various kinds of water absorbent materials is selected to be in the range of 10% to 70% (% by weight), and they are mixed together and granulated.

Figure 4:
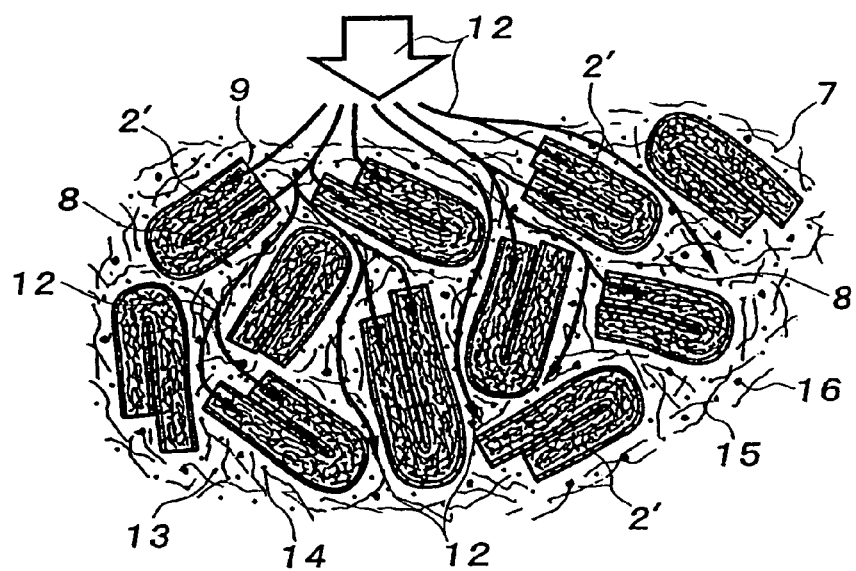
FIG. 4 is an enlarged sectional view of a granular body composed of the crushed paper pieces blended with powder bodies or fabrics having various kinds of water absorbing properties.

The granular body 7 has, as shown in FIG. 4, a void structure composed of countless communication voids 8 for guiding the discharged urine to the core part of the granular body, between the laminate layers 5', 6' of the adjacent crushed paper pieces 2'. The granular body 7 also has a water retaining structure in which the discharged urine is absorbed in the paper layer 4' between the laminate layers 5', 6' on the double surfaces through the sheared surface 9 of each crushed paper piece 2' and the absorbed urine is cut off by the laminate layers 5', 6' formed on the double surfaces and retained in the paper layer 4'.

The structure of the double sided water resistant paper 2 of the beverage pack, etc., and the structure 2' of the crushed paper piece 2' having the laminate layers 5', 6' formed on both surfaces formed by crushing the double sided water resistant paper 2 provides a good conduit action and a water retaining function to the discharged-waste processing material for pet animals, i.e., the granular body 7, so that suitability as a processing material is enhanced.

Figure 6:
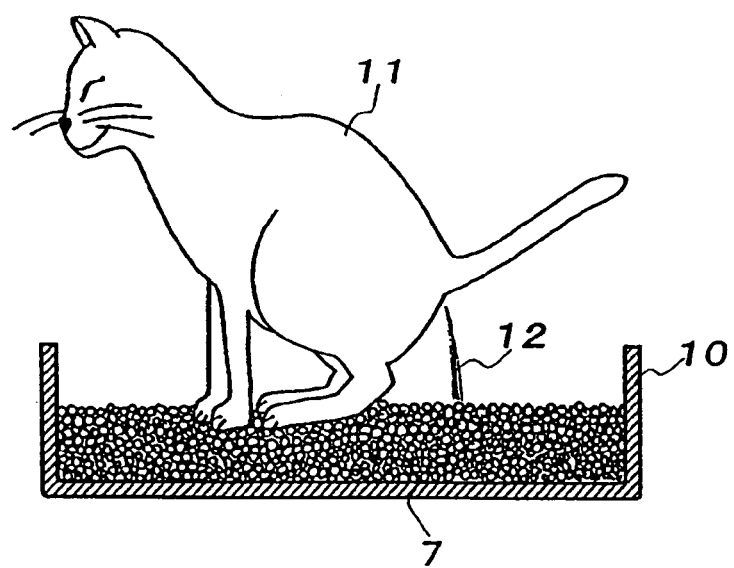
FIG. 6 is a view showing a using state of the granular bodies.

That is, as shown in FIG. 6, many granular bodies 7 are laid in a tray 10 or the like which forms a commode, so as to be subjected to discharge of urine made by a pet animal such as a cat. As shown in FIG. 4, the urine 12 discharged onto the granular bodies 7 is guided to the core part of the granular body 7 through the voids 8 formed between the laminate layers 5', 6' of the adjacent crushed paper pieces 2' and in this process, the discharged urine 12 is absorbed in the paper layers 4 between the double sided laminate layers 5', 6' through the sheared surfaces 9, and the absorbed urine is cut off by the double sided laminate layers 5', 6' and retained in the paper layers 4.

This granular body 7 exhibits such a function that the discharged urine 12 is guided to the core part of each granular body 7 and retained therein. Thus, the granular body 7 can effectively solve the problems of the discharged urine 12 wetting only the surface layer of the granular body 7 and flowing out to the adjacent granular bodies 7, or the discharged urine 12 rapidly passing through the granular body 7 to eventually wet the granular bodies 7 laid over a wide area on the tray 12.

When the paper beverage pack having the double sided laminate layers 5', 6' is crushed into pieces having sizes of about 1 to 3 mm, the double sided laminate layers 5', 6' are destroyed into the form of disaggregated fibers or powder. Thus, the water cutoff effect of the double sided laminate layers 5', 6' and the water retaining effect of the paper layers 4' cannot be expected.

Moreover, since the granular body is chiefly composed of paper which is made of pulp, it is effective for environmental preservation.

It is accepted that various kinds of water absorbent materials for supplementing the water absorbing property and the water retaining property can be blended in the granular body 7 and granulated.

For example, the granular body 7 may contain at least one of water absorbent polymer powder 13, vegetable powder 14, and vegetable fiber 15.

By this, the water absorbent polymer powder 13, etc. is distributed in the voids 8 formed between the laminate layers 5', 6' of the adjacent crushed paper pieces 2', so that it co-acts with the crushed paper pieces 2' to enhance the effect for capturing the urine 12 in the granular body 7.

The water absorbent polymer consists of starch-polyacrylonitrile hydrolyzed material, cross-linked material of starch-polyacrylate, saponified vinyl acetate-methylacrylate copolymer, cross-linked material of sodium polyacrylate or the like. When absorbing the water contained in the discharged waste, the water absorbent polymer is changed in quality into a jelly-like form and becomes able to retain a large quantity of water.

Due to mixture of this water-absorbent polymer, it co-acts with the crushed paper pieces 2' to more effectively prevent the water contained in the discharged waste from spreading over a wide area.

As the vegetable powder 14, at least one of vegetable viscous materials such as starch, CMS (carboxyl-methyl starch), and CMC (carboxyl-methyl cellulose) is used. Also as the powder 14, wood powder such as sawdust, bamboo powder and food refuse powder are used.

As the vegetable fiber 15, for example, used paper as a waste material is disaggregated into a cotton-like shape by a crushing machine, so that pulp fiber is obtained, and the pulp fiber thus obtained is used as the vegetable fiber 15, or the obtained pulp fiber and a paper-making sludge are used as the vegetable fiber 15.

The vegetable powder 14, the vegetable fiber 15 and the water absorbent polymer powder 13 are mixed with the crushed paper pieces 2' and the resultant is added with a small amount of water and granulated by a granulating machine. Then, the resultant is dried to form the granular body 7.

In the alternative, the granular body 7 contains at least one of the water absorbent polymer powder 13, the vegetable powder 14 and the vegetable fiber 15, and it further contains mineral powder 16 such as calcium carbonate, talc, bentonite and silica gel.

That is, at least one of the vegetable powder 14, the vegetable fiber 15 and the water absorbent polymer powder 13 and the mineral powder 16 are mixed with the crushed paper pieces 2' and the resultant is added with a small amount of water and granulated by a granulating machine. Then, the resultant is dried to form the granular body 7.

This mineral powder 16 is distributed in the voids 8 formed between the laminate layers 5', 6' of the adjacent crushed paper pieces 2' together with the water absorbent polymer powder 13, the vegetable powder 14 or the vegetable fiber 15, thereby adding weight to the granular body 7, so that the granular bodies 7 are not scattered by the pet animal 11 such as a cat and so that the granular bodies are not adhered to the body hair of the pet animal 11.

Figure 3C:
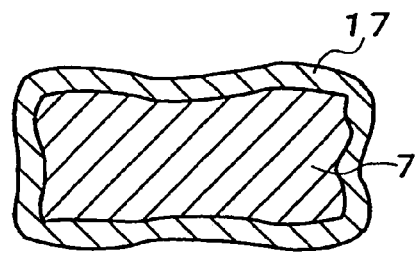
FIG. 3C is a sectional view of the granular body having a cover layer.
Figure 5:
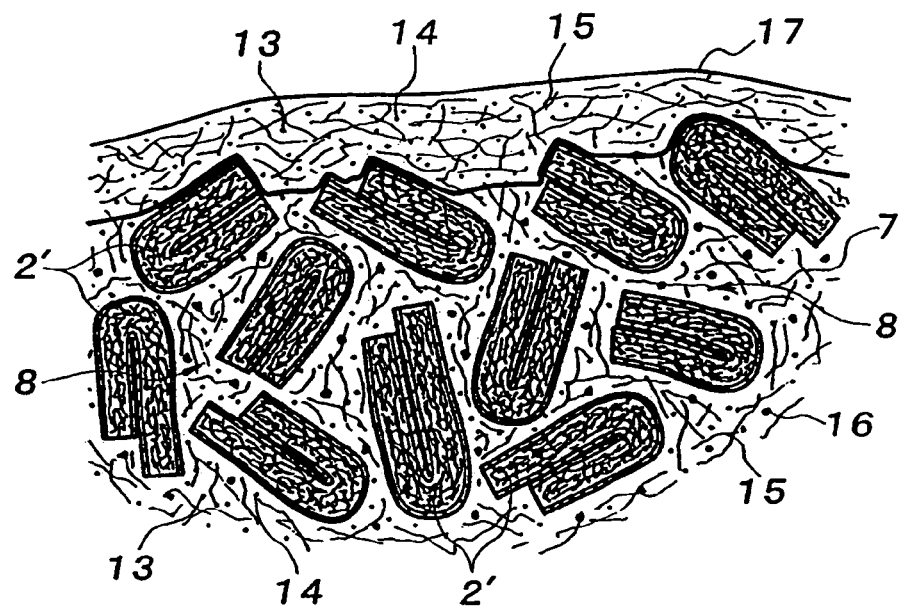
FIG. 5 is an enlarged sectional view of the cover layer.

As a preferred example, as shown in FIGS. 3C and 5, the granular body 7 is provided at an outer surface thereof with a cover layer 17 having a water absorbing property and exhibiting viscosity when it absorbs water.

For example, the water absorbent polymer 13 which exhibits viscosity when it absorbs water, or the vegetable powder 14 which likewise exhibits viscosity when it absorbs water, and the pulp fiber 15 obtained by disaggregating used paper as a waste material into a cotton shape using a crushing machine are mixed with each other. After moisture is sprayed onto the outer surface of the granular body 7, the mixture is sprinkled over the outer surface of the granular body 7, thereby forming the cover layer 17.

This cover layer 17 exhibits viscosity while rapidly absorbing the discharged urine 12 and allowing the urine 12 to permeate into the granular body 7. By this viscosity, the cover layer 17 joints the adjacent granular bodies 7 such that the bodies 7 are formed into an aggregate. The aggregate thus formed can be discarded and a new granular body 7 can be supplemented.

When compared with a coated paper obtained by applying a coating material to a sheet of paper, the laminate paper constituting the double sided water resistant paper 2 is high in mechanical strength and hardly destroyed by an external force and water added thereto at the time of granulation. Even after the granular body 7 is granulated, the laminate film (laminate layer 6') can be wholly retained on both surfaces of the paper layer 4'. Thus, the conduit effect for guiding the discharged urine into the core part of the granular body 7 and the water retaining effect for retaining water in the paper layer 4' in this process can be exhibited properly.

What is claimed is:

1. A discharged-waste processing material for use by pet animals, comprising:
    a granular body formed of an aggregate of crushed paper pieces, each having a size of 5 mm to 10 mm;
    wherein each of said crushed paper pieces comprises a paper layer, and water resistant laminate film layers on opposing sides of said paper layer;
    wherein said granular body has a plurality of communication voids formed between said water resistant laminate film layers of adjacent ones of said crushed paper pieces for guiding discharged urine to a core part of said granular body;
    wherein said crushed paper pieces have sheared surfaces through which urine can be absorbed into said paper layers thereof between said water resistant laminate layers thereof, such that the urine is retained in said paper layers; and
    wherein at least one of water-absorbent polymer powder, vegetable powder and vegetable fiber is contained in said plurality of communication voids so as to co-act with said crushed paper pieces to enhance retention of the urine in said granular body.

2. A discharged-waste processing material according to claim 1, wherein
    said granular body is provided at a surface thereof with a water-absorbent cover layer.

3. A discharged-waste processing material according to claim 2, wherein
    said water-absorbent cover layer has a property so as to become viscous when water is absorbed therein.

4. A discharged-waste processing material according to claim 1, wherein
    said granular body further contains mineral powder.

5. A discharged-waste processing material for use by pet animals, comprising:
    plural granular bodies, each of said granular bodies being formed of an aggregate of crushed paper pieces, each having a size of 5 mm to 10 mm;
    wherein each of said crushed paper pieces comprises a paper layer, and water resistant laminate film layers on opposing sides of said paper layer;
    wherein, for each of said granular bodies, said granular body has a plurality of communication voids formed between said water resistant laminate film layers of adjacent ones of said crushed paper pieces for guiding discharged urine to a core part of said granular body;

wherein said crushed paper pieces have sheared surfaces through which urine can be absorbed into said paper layers thereof between said water resistant laminate layers thereof, such that the urine is retained in said paper layers; and wherein at least one of water-absorbent polymer powder, vegetable powder and vegetable fiber is contained in said plurality of communication voids so as to co-act with said crushed paper pieces to enhance retention of the urine in each of said granular bodies.

6. A discharged-waste processing material according to claim 5, wherein each of said granular bodies is provided at a surface thereof with a water-absorbent cover layer.

7. A discharged-waste processing material according to claim 6, wherein said water-absorbent cover layer of each of said granular bodies has a property so as to become viscous when water is absorbed therein.

8. A discharged-waste processing material according to claim 5, wherein each of said granular bodies further contains mineral powder.

* * * * *